United States Patent [19]

Tyson

[11] Patent Number: 5,190,172
[45] Date of Patent: Mar. 2, 1993

[54] CONNECTION ASSEMBLY AND METHOD FOR A STRUCTURAL RACK

[75] Inventor: Paul R. Tyson, Hatfield, Pa.

[73] Assignee: Artco Corporation, Hatfield, Pa.

[21] Appl. No.: 828,185

[22] Filed: Jan. 30, 1992

[51] Int. Cl.⁵ .............................................. A47F 5/00
[52] U.S. Cl. ...................................... 211/191; 211/192
[58] Field of Search ............... 211/191, 192, 190, 187; 248/222.2, 222.1; 403/316, 252

[56] References Cited

U.S. PATENT DOCUMENTS

| | | | |
|---|---|---|---|
| 3,095,975 | 7/1963 | Cassel et al. | 211/192 |
| 3,510,010 | 5/1970 | Gasner | 211/192 |
| 4,027,453 | 6/1977 | Bridge . | |
| 4,063,835 | 12/1977 | Husband et al. | 211/192 X |
| 4,064,996 | 12/1977 | Shillum | 211/191 |
| 4,129,279 | 12/1978 | Burkholder | 211/192 X |
| 4,341,486 | 7/1982 | Hammerschlag | 211/192 X |
| 4,425,049 | 1/1984 | Travis . | |
| 4,607,576 | 8/1986 | Kranjec . | |

FOREIGN PATENT DOCUMENTS

| | | | |
|---|---|---|---|
| 2332945 | 1/1974 | Fed. Rep. of Germany | 211/191 |
| 85789 | 8/1965 | France | 211/191 |
| 1123315 | 8/1968 | United Kingdom | 211/192 |

Primary Examiner—Robert W. Gibson, Jr.
Attorney, Agent, or Firm—Rothwell, Figg, Ernst & Kurz

[57] ABSTRACT

For use in adjustable storage racks, a connection assembly is provided for connecting a support member and a stringer. The connection means is engageable with at least one slot on the support member and comprises at least one tab comprising a hook member and a locking and abutment member, with the latter member designed to prevent the connection means from becoming disengaged from the upright member. Specifically, the locking and abutment member is off set from the hook member so that the hook member is engageable with a lower edge of a slot on the support member and the locking and abutment member is lockable within the boundaries of the slot and is in suitable proximity to a top edge of the slot to abut the top edge.

10 Claims, 4 Drawing Sheets

CONNECTION ASSEMBLY AND METHOD FOR A STRUCTURAL RACK

BACKGROUND

1. Field of the Invention

This invention relates to connection assemblies and methods for connecting the components of structural racks.

2. Background Art

Structural racks and their design vary according to the supply and inventory needs of their user. The boltless variety, i.e., those racks which do not require bolts or the like for connecting the rack's stringer and support post components, are particularly preferable by industries which have frequent fluctuations in inventory or supplies. See, for example, U.S. Pat. Nos. 4,027,453; 4,064,996; 4,341,486; 4,425,049 and 4,607,576. In instances when racks are required in a short period of time boltless racks allow these industries to construct their racks with little effort and loss of time. However, the connection devices used as a substitute for bolts frequently disengage or dislodge from the support post when the rack is jostled or manipulated. This is frequently experienced when the racks are lifted and transported by forklifts and the like.

SUMMARY OF THE INVENTION

This invention provides a connection assembly for structural racks which withstands jostling or upward thrusts such as those typically delivered by forklifts. The connection assembly comprises:
(a) a support member having a planar surface on which at least one slot is defined thereon;
(b) a stringer which has two definable ends; and
(c) means for connecting the support member and the stringer wherein the connection means is attached to at least one end of the stringer and wherein the means comprises
 (i) a plate extending from the end of the stringer; and
 (ii) at least one tab extending perpendicularly from the plate wherein the tab comprises a hook member and a locking and abutment member wherein the hook member extends from the tab in one direction, and the locking and abutment member extends in a direction opposite to that direction in which the hook member extends, the locking and abutment member offset from the hook member so that the hook member is engageable with a lower edge of the slot on the support member and the locking and abutment member is lockable within the boundaries of the slot and is in suitable proximity to a top edge of the slot to abut the top edge.

DETAILED DESCRIPTION OF THE INVENTION

Figure 1:
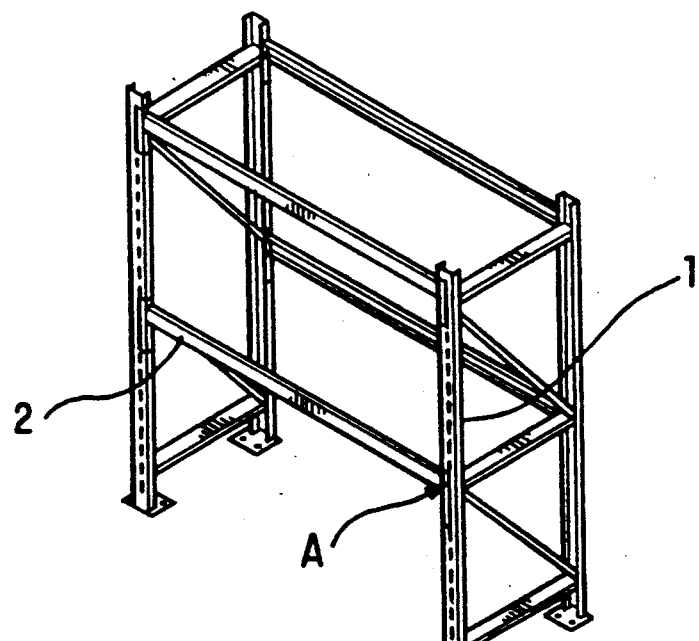
FIG. 1 is a perspective view of a structural rack assembled and connected by a connection assembly according to this invention.

As shown in FIG. 1, the connection assembly of this invention illustrated as A is embodied in a structural rack comprising a plurality of vertical support members 1 and horizontal stringers 2. This rack is designed for receiving pallets typically used with forklifts. By "structural rack," it is meant any structure which serves to store, place, collect, file or display an article or articles found in industry, the home or elsewhere. The rack's stringers can also be adjusted to receive storage shelves if necessary. The rack's stringers and support members are prepared from conventional materials. A preferred material is steel. The connection assembly may be prepared from the same material used to prepare the stringers and support members, provided the locking and abutment member described later below has sufficient flexibility to lock into slots on the support member. A detailed construction of one embodiment of the connection assembly A is illustrated in FIG. 2.

Figure 2:
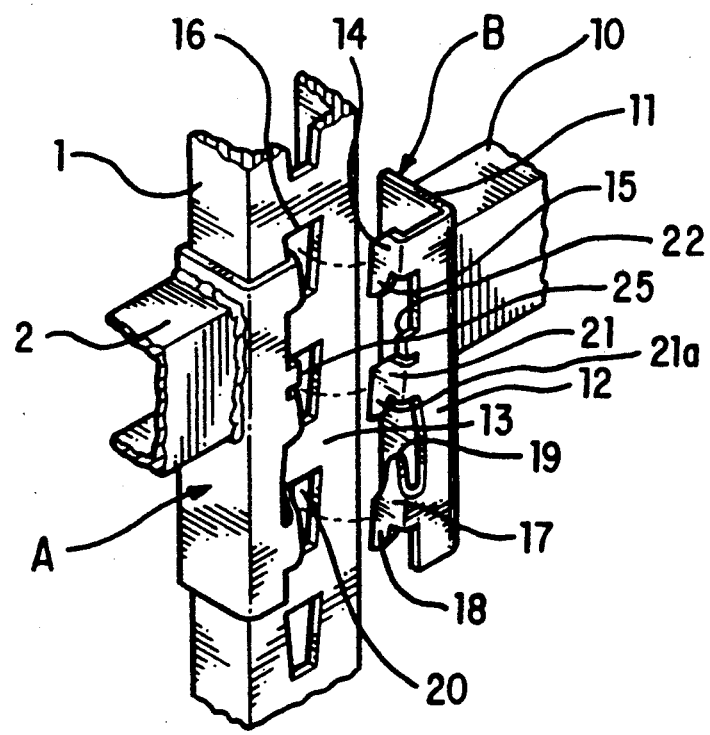
FIG. 2 is a perspective view, in partial section, of the connection assembly according to the invention.

As illustrated in FIG. 2, connection assembly A is attached to the end of stringer 2 and engaged with support member 1. Support member 1 preferably has a plurality of slots for securely engaging the connection means at any desired level.

Conventional channel-shaped support members 1 having three perpendicular sides are suitable for use with this invention. Typically, such support members comprise a side which represents a center planar surface, the edges of which are perpendicularly attached to the other two sides. The three sides form a channel or groove.

A series of slots, e.g., slots 16, 25 and 20, are cut or otherwise formed at positions down the length of the support member 1, e.g., the support member's center planar surface. The embodiment illustrated in FIG. 2 has one column of keystone-shaped slots for attaching a stringer to the support member wherein the slots are large enough to receive the parts of more than one connection assembly. As an alternative embodiment, the support member may have two or more columns of slots wherein each slot of each column can only receive one connection assembly.

The means by which the connection assembly engages the slots on the support member is illustrated with reference to an additional connection assembly B in FIG. 2. Connection assemblies A and B are mirror images of each other.

Connection assembly B connects stringer 10 to support member 1. As shown, connection assembly B is attached to stringer 10 via an angle plate 11. Angle plate 11 has one side attached to stringer 10 in a perpendicular fashion. Angle plate 11 has a further side plate 12 and an angle thereto. Plate 12 is perpendicular to plate 11 so that plate 12 extends from the end of the stringer. It is preferable that plate 12 extends from the stringer so that when the connection assembly is connected with the channel support member 1, plate 12 and the slot-containing planar surface of the channel support member 1 are flush in contact with each other.

Plate 11 and plate 12 may also be two plates which are connected, e.g., welded, together at perpendicular angles. However, they are preferably formed at an angle from one plate, as shown.

Extending perpendicularly from plate 12 are three tabs. A first type of tab 14 comprises one hook member 15. Tab 14 and hook member 15 are designed to be engageable with slot 16 on the support member's planar surface 13. In this particular embodiment, tab 14 and hook member 15 are cut so that hook member 15 is directed down the longitudinal axis of plate 12, thus providing a tab which is engageable with the lower edge of slot 16. However, any conventional design suitable for engaging or hooking a slot may be used.

Figure 4:
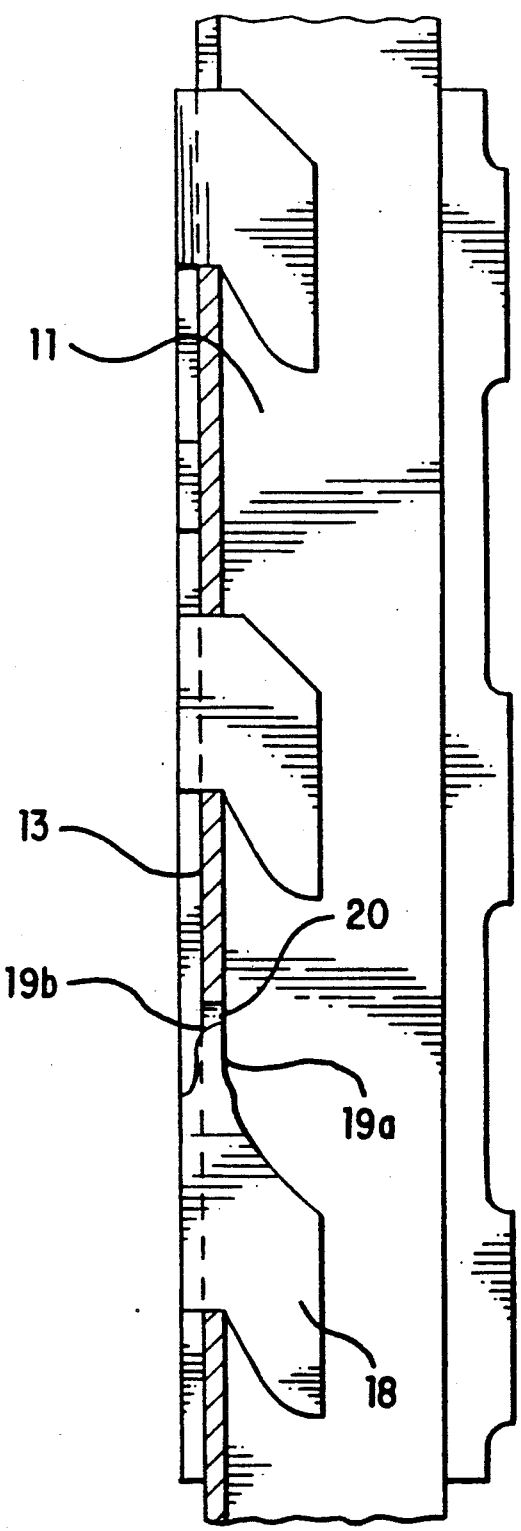
FIG. 4 is a partial cross section along A—A of the connection assembly of the invention illustrated in FIG. 3.

A second and unique type of tab 17 comprises a hook member 18 which is generally similar to hook member 15 and may be any conventional design suitable for engaging another slot 20. Tab 17 also has a locking and abutment member 19 which extends from tab 17 in a direction opposite to that in which the hook member extends, i.e., the locking and abutment member 19 is directed up the longitudinal axis of plate 12. The locking and abutment member 19 is off set from hook member 18 so that the hook member is engageable with a lower edge of slot 20 and the locking and abutment member 19 is lockable within the boundaries of slot 20. As illustrated in FIG. 2, by "off set" it is meant that the longitudinal axis of member 19 is parallel to the axis of and off set from the longitudinal axis of hook member 18. As illustrated in FIG. 4, member 19 can be any suitable design which is suitable for abutment with slot 20. In the preferred embodiment, member 19 has a first edge 19a which is parallel to planar surface 13 prior to locking the device onto the support member 11. The top of member 19 is rounded from edge 19a to form a second edge 19b which faces the top edge of slot 20 and is exposed at the front of planar surface 13 when member 19 has been locked into the slot. This design is preferred for its ease of manufacture.

Figure 3:
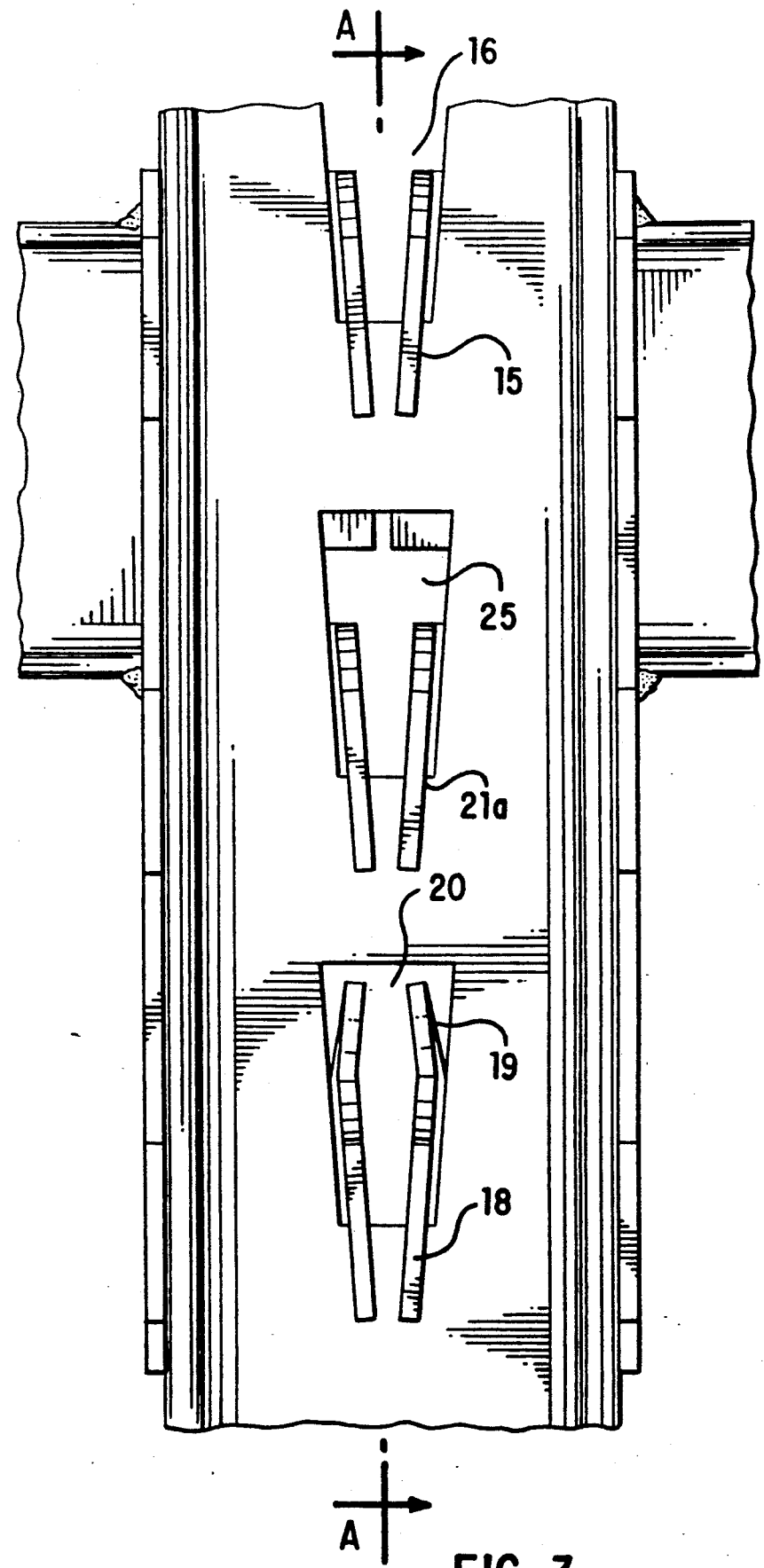
FIG. 3 is a rear elevational view, in partial section, of the connection assembly according to the invention.

Member 19 enters into the boundaries of slot 20 only after member 18 has been engaged with the lower edge of slot 20. As illustrated in FIG. 3, once the connection assembly has been locked into the support member 1, edge 19b of member 19 is in suitable proximity to an upper edge of slot 20 to abut the top edge. Member 19 thus provides a means for preventing disengagement of the connection means from support member 1.

As illustrated in FIG. 2, the preferred embodiment of this invention also includes a third tab 21. Tab 21 has the general configuration of tab 14, including hook member 21a which has a design similar to hook member 15, and extends perpendicularly from plate 12. A shoulder extension 22 protrudes from plate 12 just above tab 21. In this embodiment, tab 21 and hook member 21a are engageable with a slot 25 which is intermediate to slot 16 and slot 20. Shoulder extension 22 contacts a surface of the planar surface 13 above the edge of slot 25 and provides a means for preventing stringer 11 from rotating about its axis or swinging towards the axis of support member 1. Hook members 15, 21a and 18, plate 12 and other connection assemblies also contribute in preventing such movement by the stringer.

Figure 5:
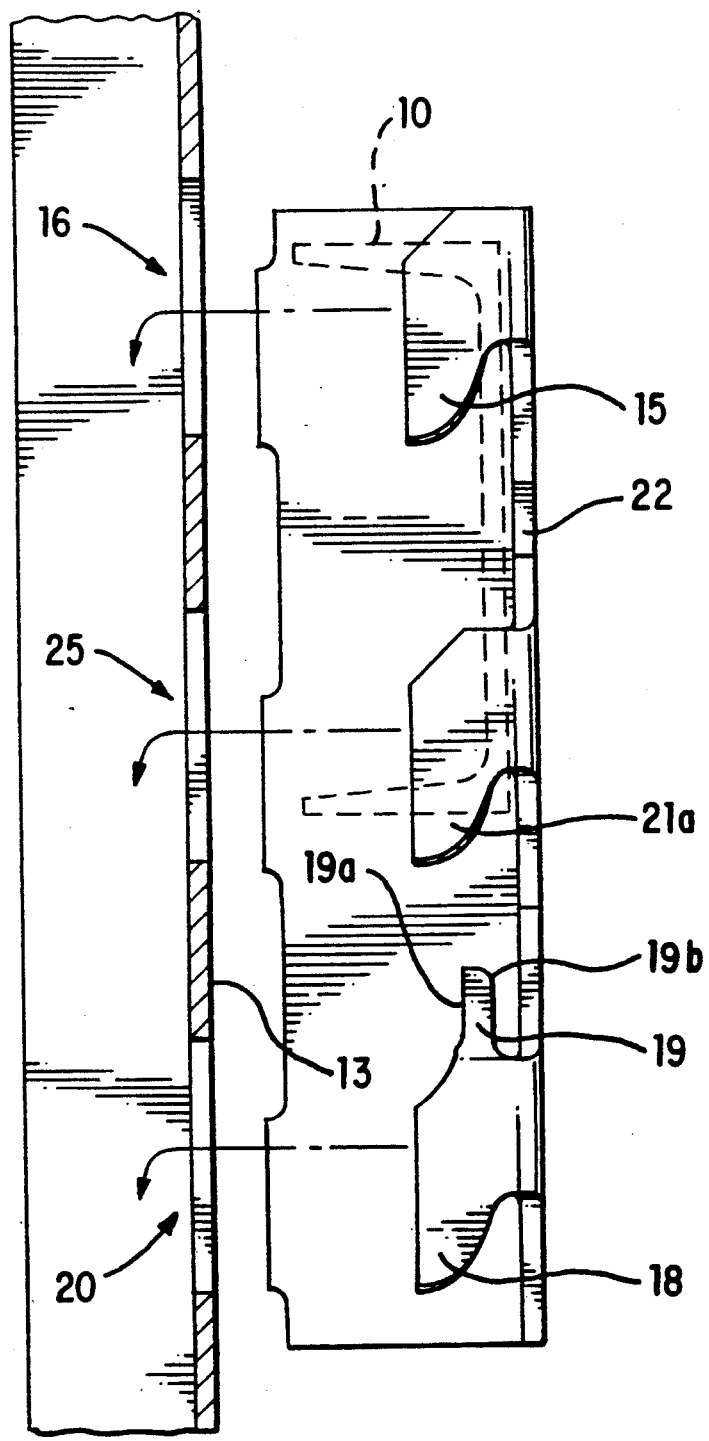
FIG. 5 is a partial cross section, with portions cut away, illustrating how to connect the connection means and the support member according to this invention.

Engagement of the connection assembly of the preferred embodiment is illustrated in FIG. 5. Hook members 15, 21a and 18 are positioned within slots 16, 25, and 20 respectively. Edge 19a of locking and abutment member 19 comes in parallel contact with planar surface 13 when the hook members are positioned in those slots. To lock the device, the connection assembly is pushed in to engage the hook members behind the planar surface. This pushing action pushes edge 19a along the top edge of slot 20 until it clears the edge, at which moment the locking and abutment member 19 snaps into slot 20, thus positioning it within the slot's boundaries as illustrated in FIG. 4. While the embodiment illustrated herein indicates a connection assembly having three tabs, the connection assembly can be modified so that only a tab comprising hook member 18 and locking and abutment member 19 is required for connection to support member 1.

As indicated above, once the connection means has been locked onto the support member, the locking and abutment member 19 is substantially within the boundaries of slot 20. Member 19 remains within those boundaries because of the off set design thereof. Further, hook members 15, 18 and 21a engage one side of planar surface 13, and plate 12 presses on the other side, thus preventing member 19 from being moved out of the slot. See FIG. 3, plate 12 not shown.

Accordingly, member 19 is locked within the slot's boundaries and will be in suitable proximity to the top edge of slot 20 for abutment of the top edge if a thrust forces the connection means upward.

As illustrated in FIG. 1, the connection assembly can be used to connect all of the stringer and support members of a structural rack. The connection assembly is also suitable for a variety of structural racks, and especially those designed for maneuvering by fork lifts. In the preferred embodiment, it has been found that the locking and abutment member 19 provides an effective connection with the slots when upward forces are exerted on the assembly's horizontal stringers. Tests show that the connection assembly of this invention meets requirements set out in *Rack Manufacturers Institute Specification for the Design and Testing and Utilization of Industrial Steel Storage Racks*, Part I, June 1990 edition. Specifically, the connection assembly of this invention per connection withstands an upward force of 1,000 pounds without failure or disengagement.

Since there are many modifications, variations and changes in design and detail, it is intended that all matter in the foregoing description and shown in the corresponding drawings be interpreted as illustrative and not in a limiting sense.

What is claimed:

1. A connection assembly for a structural rack comprising
   (a) a support member having a planar surface on which at least one slot is defined thereon;
   (b) a stringer which has two definable ends; and
   (c) means for connecting the support member and the stringer wherein the connection means is attached to as least one end of the stringer and wherein the means comprises
      (i) a plate extending from the end of the stringer; and
      (ii) at least one tab extending perpendicularly from the plate wherein the tab comprises a hook member and a locking and abutment member wherein the hook member extends from the tab in one direction, and the locking and abutment member extends in a direction opposite to that direction in which the hook member extends, the locking and abutment member off set from the hook member so that the hook member is engageable with a lower edge of the slot on the support member and the locking and abutment member is lockable within the boundaries of the slot and is in suitable proximity to a top edge of the slot to abut the top edge, the locking and abutment member having a first edge suitable for parallel contact with the planar surface of the support member prior to locking the locking and abutment member into the slot and a second edge which is rounded and suitable for abutment to the top edge of the slot.

2. A connection assembly according to claim 1 wherein the support member has at least two slots defined thereon and the connection means further comprises at least one additional tab extending perpendicularly from the plate wherein the additional tab comprises one hook member which is engageable with one of the slots on the support member's planar surface.

3. A connection assembly according to claim 1 wherein the support member has at least three slots defined thereon and the connection means further comprises two additional tabs wherein the two additional tabs extend perpendicularly from plate (i) and one of the additional tabs comprises a hook member and a shoulder extension which protrudes from the plate.

4. A connection assembly according to claim 3 wherein the additional tab comprising the hook member and shoulder extension is intermediate to the other additional tab and the tab comprising the hook member and locking and abutment member, and wherein the hook members on the tabs are engageable with the slots on the planar surface of the support member.

5. A connection assembly according to claim 3 wherein the shoulder extension stabilized movement of the stringer.

6. A method of connecting a support member having a planar surface on which at least one slot is defined thereon and a structural rack stringer which has two definable ends, the method comprises employing
 (i) a plate extending from the end of the stringer; and
 (ii) at least one tab extending perpendicularly from the plate wherein the tab comprises a hook member and a locking and abutment member wherein the hook member extends from the tab in one direction, and the locking and abutment member extends in a direction opposite to that direction in which the hook member extends, the locking and abutment member offset from the hook member so that the hook member is engageable with a lower edge of the slot on the support member and the locking and abutment member is lockable within the boundaries of the slot and is in suitable proximity to a top edge of the slot to abut the top edge, the locking and abutment member having a first edge suitable for parallel contact with the planar surface of the support member prior to locking the locking and abutment member into the slot and a second edge which is rounded and suitable for abutment to the top edge of the slot.

7. A method according to claim 6 wherein the support member has at least two slots defined thereon and the connection means further comprises at least one additional tab extending perpendicularly from the plate wherein the additional tab comprises one hook member which is engageable with one of the slots on the support member's planar surface.

8. A method according to claim 7 wherein the support member has at least three slots defined thereon and the connection means further comprises two additional tabs wherein the two additional tabs extend perpendicularly from plate (i) and one of the additional tabs comprises a hook member and a shoulder extension which protrudes from the plate.

9. A method according to claim 8 wherein the tab comprising the hook member and shoulder extension is intermediate to tab (ii) comprising the hook member and locking and abutment member and other additional tab and wherein the hook members on the tabs are engageable with the slots on the planar surface of the support member.

10. A method according to claim 8 wherein the extension stabilizes movement of the stringer.

* * * * *

UNITED STATES PATENT AND TRADEMARK OFFICE
CERTIFICATE OF CORRECTION

PATENT NO. : 5,190,172

DATED : March 2, 1993

INVENTOR(S) : Paul R. Tyson

It is certified that error appears in the above-identified patent and that said Letters Patent is hereby corrected as shown below:

Col. 4, line 17, do not start a new paragraph.

Col. 4, line 51, "as" should be --at--.

Col. 5, line 29, "stabilized" should be --stabilizes--.

Signed and Sealed this

Eleventh Day of January, 1994

Attest:

BRUCE LEHMAN

Attesting Officer  Commissioner of Patents and Trademarks